March 7, 1950  A. L. SCOTT  2,499,530
PRESS MECHANISM

Filed March 21, 1945  2 Sheets-Sheet 1

INVENTOR.
ARTHUR L. SCOTT
BY
Herschel C. Omohundro
ATTORNEY

March 7, 1950
A. L. SCOTT
2,499,530
PRESS MECHANISM
Filed March 21, 1945
2 Sheets-Sheet 2
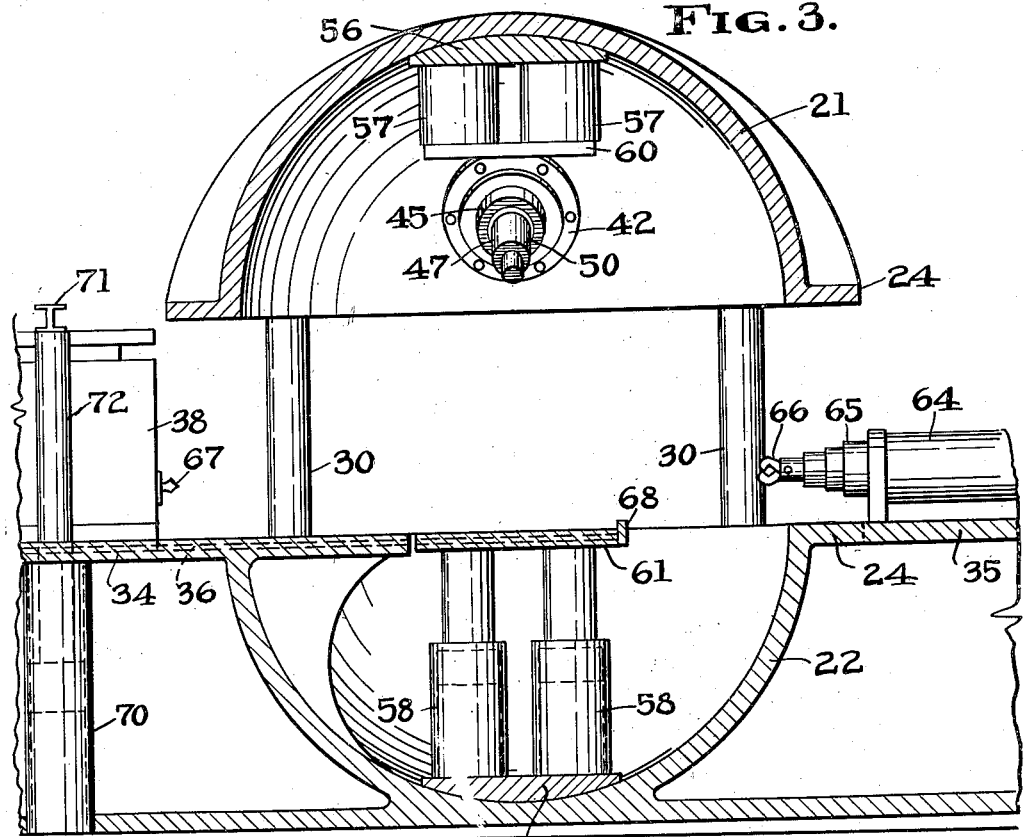
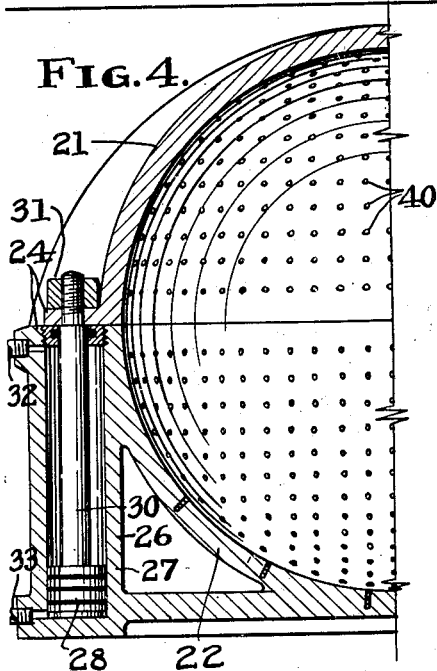
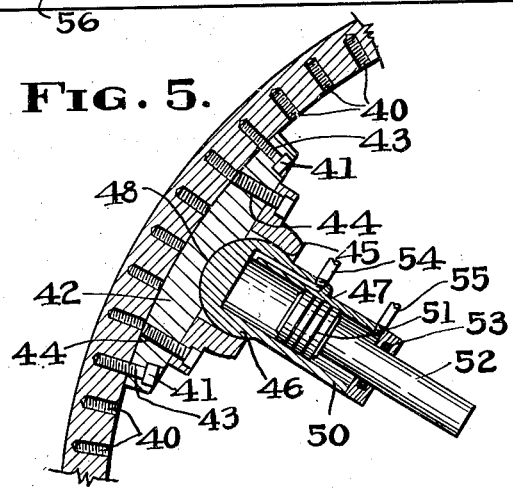
INVENTOR.
ARTHUR L. SCOTT
BY
Herschel C. Omohundro
ATTORNEY Patented Mar. 7, 1950

2,499,530

UNITED STATES PATENT OFFICE 2,499,530

PRESS MECHANISM

Arthur L. Scott, Columbus, Ohio, assignor to The Denison Engineering Company, Columbus, Ohio, a corporation of Ohio Application March 21, 1945, Serial No. 584,000

10 Claims. (Cl. 78—0.5)

This invention relates generally to the formation of articles by stamping, pressing, or molding the same from plastic materials, powdered metals or other suitable materials, and mechanisms employed for performing such operations.

More particularly, the invention is directed to an improvement in press mechanisms by which articles of relatively large sizes and intricate designs may be quickly, easily and accurately formed by stamping, pressing or pressure molding operations which, heretofore, have been confined to small, simple articles.

One object of the invention is to provide a press mechanism in which a mold may be supported and forces applied thereto from an infinite number of angles whereby materials in the mold will be caused to assume a desired shape.

Another object of the invention is to provide a press mechanism having a chamber for the reception of a mold with movable parts and power devices for moving the mold parts, the power devices being mounted on the inner chamber walls at the most auspicious places to secure the application of direct force to the mold parts.

A further object of the invention is to provide a press mechanism having a plurality of separable body members with recesses which form a spherical chamber when the body members are assembled, the inner surfaces of the body members receiving base members or adapters which are provided with partially spherical surfaces to firmly engage the surface of the chamber regardless of the position of the adapters relative to the vertical and horizontal axes of the chamber, the adapters being designed to receive and hold pressing devices which operate on a mold disposed in the chamber.

A still further object is to provide a press having a pair of body sections with semi-spherical recesses and providing the press with power cylinders for moving the body sections together to form a spherical chamber after a mold has been positioned in registration therewith and separating the body sections after a pressing operation to permit the removal of the mold after an article has been formed therein.

An object of the invention also consists in providing a press mechanism including a plurality of reinforced shell-like members and means for securing the same in assembled relationship whereby they will form a chamber for housing a mold having movable sections, the inner wall of the chamber serving as a backing and supporting wall for one or more power cylinders or other pressing units which may be disposed in any of a number of positions to apply force to the mold from any desired angle depending upon the shape of the article being produced in the mold.

An object also resides in providing a mechanism for producing articles by pressing or pressure molding which mechanism includes a plurality of separable body sections forming a spherical chamber when assembled, the sections receiving adapters on which power cylinders are universally mounted, the sections also receiving power operated platens which cooperate to hold a separable mold together while the power cylinders apply force to other parts of the mold in the formation of an article.

A further object is to provide the press mechanism mentioned in the preceding paragraphs with hydraulic means for moving the body sections as well as the mold parts and for moving the mold into and out of the chamber or space between the body members before and after a pressing or molding operation.

Further objects and advantages of the present invention will be apparent from the following description, reference being had to the accompanying drawings wherein a preferred form of embodiment of the invention is clearly shown.

Fig. 3 is a similar view showing the press with separable portions thereof separated and the mold removed to release a previously formed article;

Fig. 4 is a detailed vertical sectional view showing the power mechanism for effecting the opening and closing movements of the press sections;

Fig. 5 is a detailed sectional view taken through one of the press sections to show the attachment of an adapter to the press section.

Figure 1:
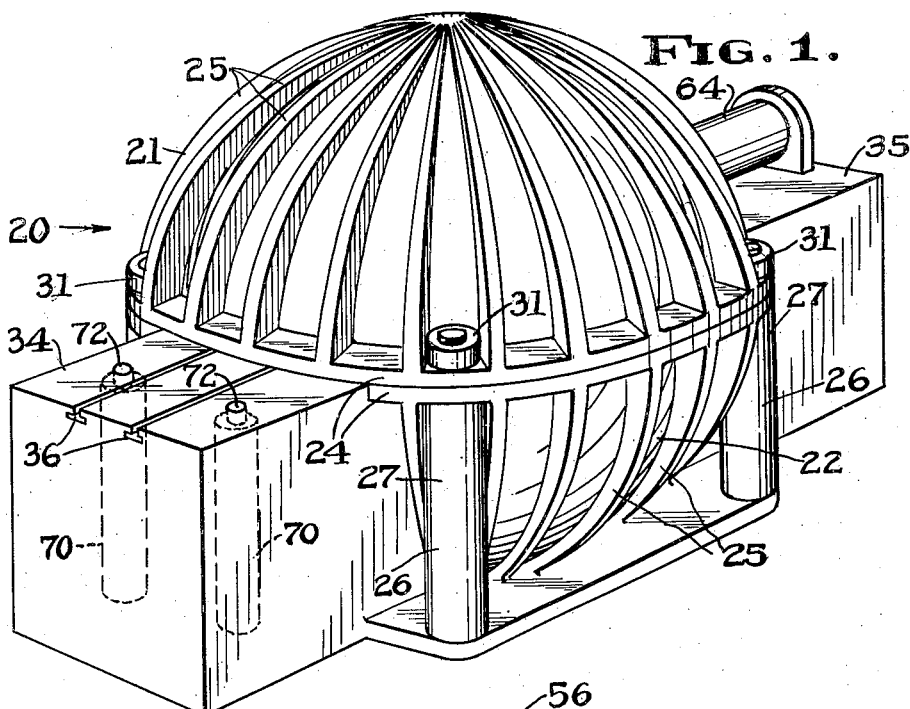
Fig. 1 is a perspective view of a press embodying the principles of the present invention.
Figure 2:
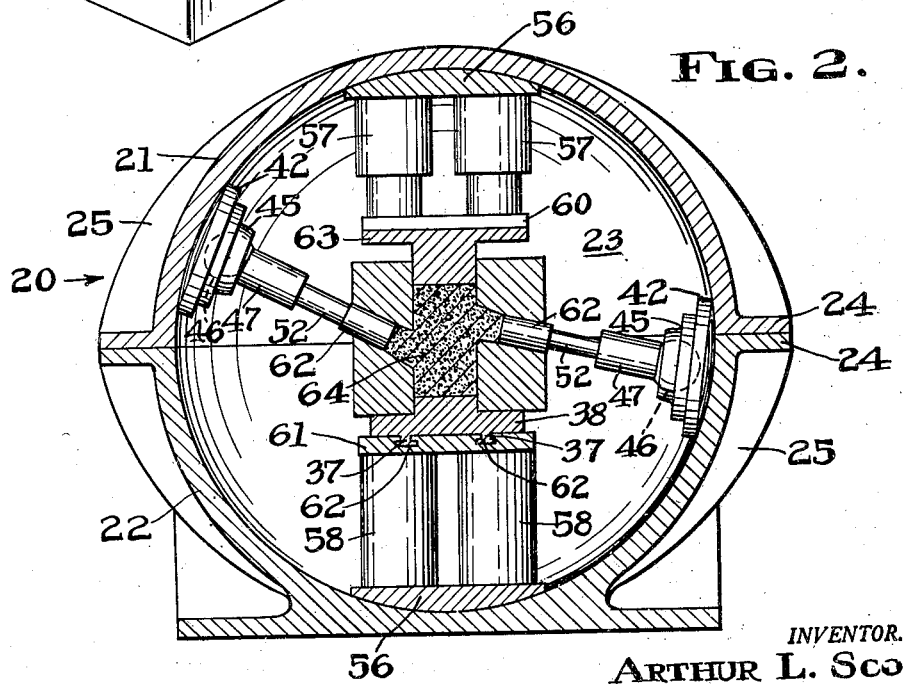
Fig. 2 is a vertical, transverse sectional view taken through the press shown in Fig. 1 showing the separable portions thereof closed with a mold in place therein.

Referring more particularly to the drawings, the press comprising the present invention is designated generally by the numeral 20. This press includes a plurality of separable sections 21 and 22. In this instance two sections are provided, these being semi-spherical in shape and hollow so that when assembled they form a spherical chamber 23. Each section has a ring-like flange 24 on its meeting face and a plurality of reinforcing ribs 25 extend from this flange to the semi-spherical exterior surface of the body or section. These ribs radiate from the center of the section to the outer edge of the flange 24.

The lower section 22 of the press 20 is provided with power cylinders 26 which are disposed in registration with the flange 24 and extend downwardly therefrom. These power cylinders each include a cylinder 27 either secured to or integrally formed with the section 22 which cylinder receives for sliding movement a piston 28 having an upwardly projecting piston rod or stem 30. The upper end of the rod 30 is reduced for insertion in an opening formed in the flange 24 of the upper section 21, the reduced upper end being threaded to receive a nut 31, used to secure the rod in place. Fluid conduits 32 and 33 serve to conduct fluid to and from the upper and lower ends of the cylinder 27 to effect movement of the piston 28 therein and consequently the opening and closing movement of the press section 21.

As shown in Figs. 1 and 3, the lower section 22 is formed with diametrically opposed shelf-like platforms 34 and 35. One of these platforms 34 extends into the interior of the section as well as outwardly therefrom while the other platform 35 is disposed entirely on the outside of said section 22. The upper surface of the platform 34 has parallel T slots 36 formed therein which extend from the inner end of the platform to the outer end thereof. These slots 36 receive T-shaped slides 37 extending from the bottom surface of a mold 38 to guide such mold in movement into and out of the press 20.

From Figs. 4 and 5 it will be apparent that both of the press sections 21 and 22 have tapped holes 40 extending radially into the section walls from the inner surface. These tapped holes receive screws 41 employed in securing adapter plates 42 in adjusted positions in the press. Adapter plates 42 comprise disks or other suitably shaped pieces which have a surface shaped to match the spherical inner surface of the press sections 21 and 22. The plates 42 are also provided with a plurality of holes 43 for the reception of the screws 41. Of course, the holes 43 will be so formed as to extend radially from the center of the spherical chamber when the adapters are placed in the press. It should be obvious that such holes could be slotted if desired to afford a slight initial adjustment prior to finally tightening the screws 41.

Additional holes 44 are formed in the plates 42 to receive screws employed in securing retaining plates 45 in positions to clamp spherical heads 46 of pressing cylinders 47 in place on the adapters, the latter having seats 48 to receive such heads. The body portions 50 of the power cylinders 47 project beyond the clamp plates and are made hollow to receive the pistons 51. Rods or rams 52 extend from the pistons 51 through packing heads 53 which close the outer ends of the cylinders. Oil pressure lines 54 and 55 extend to each end of the power cylinders from a previously mentioned or any suitable power source to cause movement of the pistons 51.

Each of the sections 21 and 22 also has adapter plates 56 fixed to the central portions of the inner surfaces, these plates serving to support power cylinders 57 and 58 in vertically registering relation. It should be obvious that although four of each of the cylinders 57 and 58 are shown, a single cylinder of suitable size could be employed for each group and guide means provided to prevent turning movement of the platens. The piston rods or rams of the cylinders 57 are connected by platen 60 for movement in unison while those of cylinders 58 are likewise connected by platen 61, the latter having T-slots 62 which register with the slots 36 when the platen 61 is at the proper elevation, as shown in Fig. 3. At this time, the mold 38 may be moved into and out of the press without inconvenience. After the mold 38 has been inserted, the platen 61 may be lowered to position the mold in the proper location for the operation of the power cylinders 47. The press may then be closed by applying pressure to the upper surfaces of the pistons 28. If desired, the application of fluid pressure may be continued to retain the press closed or the lines may be blocked to prevent forces tending to separate the press sections from expelling the fluid from above the pistons 28. It is also within the concept of the invention to provide a mechanical lock of suitable type to prevent undesired separation of the press sections.

After the press has been closed, the power cylinders 47 and 57 are operated to apply force to movable parts 62 and 63 of the mold to cause them to compress the material 64 previously inserted in the mold before it was moved into the press. The cylinders 47 and 57 may be operated simultaneously or in any order necessary to produce the required article. It will be noted that the mold parts 62 are separate from the rams 52 so that the mold may be conveniently inserted and removed from the press.

When the required force has been exerted to form the article, the platen 60 and rams 52 are withdrawn from the mold, and fluid pressure is applied to the power cylinders 26 to raise the section 21 to open position. Fluid pressure is then supplied to power cylinders 58 to raise platen 61 into registration with platform 34. At this time another horizontally arranged power cylinder 64 mounted on platform 35 and having a combination ram 65 may be operated to slide the mold 38 onto platform 34 and out of the press. The ram 65 is provided at its outer end with a readily detachable coupling 66 which cooperates with a knob 67 on the mold to transmit motion from the ram 65 to the mold. The coupling device 66 is so formed that when the mold is first engaged thereby, a firm connection will be established by which movement of the mold into and out of the press by the ram 65 may be effected. At the termination of the inward movement, the mold will engage a suitable stop 68 and continued movement of the ram 65 will effect the disconnection thereof from the mold. The ram will continue to retract until it is entirely removed from between the press sections and thus will not interfere with closing movements thereof.

The ram 65 is illustrated in a partially retracted condition and disconnected from the mold.

As shown in Figs. 1 and 3, the platform 34 has a vertical power cylinder 70 at the outer side of each groove 36. When the mold is moved out of the press, it is brought to rest between these power cylinders 70 and a beam 71 is secured to the top section of the mold, the ends of the beam projecting over the rams 72 of the cylinders 70. These devices may then be operated to raise the top or cover section of the mold, after which the mold may be disassembled to permit the removal of the formed article. The mold sections may then be reassembled, charged with the proper material and the mold reinserted in the press in the manner above described for another forming operation.

From the foregoing it will be apparent that a press has been provided which is particularly adapted to the production of pressure molded articles of intricate or special design. The spherical bearings between the power cylinders 47 and the adapter plates 42 permit the latter to be adjusted to the position wherein the most direct application of force of the rams 52 will be secured.

While the form of embodiment of the present invention as herein disclosed constitutes a preferred form, it is to be understood that other forms might be adopted, all coming within the scope of the claims which follow.

I claim:

1. Press apparatus comprising a plurality of separable body sections having recesses with curved inner surfaces; means for holding said body sections in abutting relationship with the recesses forming a substantially spherical chamber; adapter means secured to the curved inner surfaces of said body sections; and pressing means having a universal connection with said adapter means whereby said pressing means may be adjusted relative to an article in said chamber.

2. Press apparatus comprising a plurality of separable body sections having recesses with curved inner surfaces; means for holding said body sections in abutting relationship with the recesses forming a substantially spherical chamber; adapter means having spherical surfaces for adjustably engaging the curved surfaces of said sections; means for securing said adapters in positions of adjustment; and pressing means carried by said adapters.

3. Press mechanism comprising a plurality of body members having recesses to form a substantially spherical chamber when said members are assembled; a power cylinder having a pressing ram; and means for securing said power cylinder on the inner surfaces of said recesses with the axis of said ram substantially radiating from the center of said spherical chamber.

4. Press mechanism comprising a plurality of body members having concave recesses; means for holding said members in assembled relationship with said recesses forming a spherical chamber; mounting plate means formed for engagement with the surfaces of said recesses, said plate means having power cylinder abutting surfaces disposed normal to lines radiating from the center of said chamber in any position of engagement of said plate means with the inner surfaces of said body members; and power cylinder means engaging said mounting plate means.

5. Press mechanism comprising a plurality of body members having concave recesses; means for holding said members in assembled relationship with said recesses forming a spherical chamber; mounting plate means formed for attachment to said body members in different positions on the surfaces of said recesses; power cylinder means engaging said mounting plate means, said power cylinders having pressing rams normally directed toward the center of said chamber in each of the variety of positions of said mounting plate means, and means securing said power cylinder means to said mounting plates for limited universal adjustment whereby said rams may be directed toward points eccentric to the center of said chamber.

6. Press mechanism comprising a plurality of body members having concave recesses formed therein; means for moving said members into assembled relationship with said recesses forming a substantially spherical chamber; power cylinder means disposed in diametrically opposed relationship and operative to support a mold and exert compressive forces thereon; mounting plate means formed for attachment to said body members on the surfaces of said recesses, said mounting plates being capable of location at any point on the chamber surface between said power cylinder means; and additional power cylinder means supported by said mounting plate means, said additionl cylinder means having pressing rams directed substantially toward the center of said chamber in all locations of said mounting plate means.

7. Press mechanism comprising a plurality of body members having concave recesses formed therein; means for moving said members into assembled relationship with said recesses forming a substantially spherical chamber; power cylinder means disposed in diametrically opposed relationship and operative to support a mold and exert compressive forces thereon; and pressing mechanism secured to said body members on the surfaces of said recesses for adjustment around the axes of said power cylinder means and in planes parallel to said axes between said power cylinders, said pressing mechanism having pressing rams directed substantially toward the center of said chamber in all positions of adjustment of said pressing mechanism.

8. Press apparatus comprising a plurality of separable body sections cooperating to form a substantially spherical chamber; pressing means in said chamber, said pressing means having a power cylinder and a ram element projecting therefrom; and means for securing said pressing means to the inner spherical wall of said chamber at any desired point, the ram element of said pressing means being directed substantially toward the center of said spherical chamber in each location of said pressing means.

9. Press apparatus comprising a pair of body sections having recesses which form a substantially spherical chamber when said sections are placed in abutting relationship; means for moving said sections into and out of abutting relationship; pressing means mounted on said sections, said pressing means having a power cylinder and a ram element projecting therefrom; and means for securing said pressing means to the inner surfaces of said body sections at any desired point, the ram element of said pressing means being directed toward the center of said spherical chamber in every location of said pressing means.

10. Press apparatus comprising a plurality of separable body sections having recesses with curved inner surfaces; hydraulic means for moving said body sections into abutting relationship wherein said recesses form a spherical chamber; adapter means formed for attachment at any desired point on the inner surfaces of said body sections; and a hydraulic power unit mounted on said adapter means, said power unit having a ram, said adapter in every position of attachment supporting said power unit with the axis of said ram directed toward the center of said chamber.

ARTHUR L. SCOTT.

REFERENCES CITED

The following references are of record in the file of this patent:

UNITED STATES PATENTS

| Number | Name | Date |
|---|---|---|
| 426,653 | Aiken | Apr. 29, 1890 |
| 774,154 | Budd | Nov. 8, 1904 |
| 1,388,138 | Atcheson | Aug. 16, 1921 |
| 1,509,380 | Talalay | Sept. 23, 1924 |
| 1,892,942 | Gammeter | Jan. 3, 1933 |
| 1,946,117 | Sparks | Feb. 6, 1934 |
| 2,089,030 | Kratky | Aug. 3, 1937 |
| 2,279,540 | Voth et al. | Apr. 14, 1942 |

FOREIGN PATENTS

| Number | Country | Date |
|---|---|---|
| 202,008 | Great Britain | Aug. 7, 1923 |
| 485,543 | France | Jan. 16, 1918 |